United States Patent [19]

Okamoto et al.

[11] Patent Number: 5,502,134

[45] Date of Patent: Mar. 26, 1996

[54] RESIN COMPOSITION CONTAINING A POLYCARBONATE-POLYDIMETHYLSILOXANE

[75] Inventors: Masaya Okamoto; Takashi Kanezaki, both of Ichihara, Japan

[73] Assignee: Idemitsu Petrochemical Co., Ltd., Tokyo, Japan

[21] Appl. No.: 282,157

[22] Filed: Jul. 28, 1994

Related U.S. Application Data

[63] Continuation of Ser. No. 9,384, Jan. 27, 1993, abandoned, which is a continuation of Ser. No. 640,416, filed as PCT/JP90/00864, Jul 5, 1990, abandoned.

[30] Foreign Application Priority Data

Jul. 7, 1989 [JP] Japan .................. 1-174046

[51] Int. Cl.⁶ .................. C08L 69/00
[52] U.S. Cl. .................. 524/537; 524/588; 525/464; 528/26; 528/29
[58] Field of Search .................. 525/464, 474; 528/26, 29; 524/537, 588

[56] References Cited

U.S. PATENT DOCUMENTS

| | | | |
|---|---|---|---|
| 3,189,662 | 6/1965 | Vaughn | 528/29 |
| 3,832,419 | 8/1974 | Merritt | 528/29 |
| 4,224,215 | 9/1980 | Macke | 525/464 |
| 4,600,632 | 7/1986 | Paul et al. | 428/220 |
| 4,657,989 | 4/1987 | Evans | 525/464 |
| 4,681,922 | 7/1987 | Schmidt et al. | 528/29 |
| 4,732,949 | 3/1988 | Paul et al. | 525/464 |

FOREIGN PATENT DOCUMENTS

| | | |
|---|---|---|
| 0162245 | 11/1985 | European Pat. Off. |
| 0205012 | 12/1986 | European Pat. Off. |
| 376052 | 7/1990 | European Pat. Off. |
| 1513506 | 2/1968 | France |

OTHER PUBLICATIONS

Patent Abstracts of Japan, vol. 6, No. 231 (C–135) (1109) Nov. 1982; abstract of JP 57–133149.

Chemical Abstracts, vol. 90, No. 2, Jan. 1979, Sheludyakov et al, "Organosilicon polycarbonates.", p. 7081. No. 7078Y.

*Primary Examiner*—Ralph H. Dean
*Attorney, Agent, or Firm*—Frishauf, Holtz, Goodman, Langer & Chick

[57] ABSTRACT

A polycarbonate-polydimethylsiloxane copolymer, the copolymer comprising a polycarbonate block of the formula

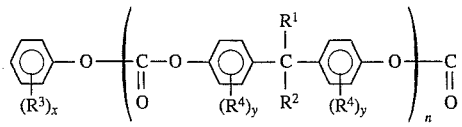

wherein $R^1$ and $R^2$ are hydrogen or a $C_1$–$C_4$ alkyl, $R^3$ and $R^4$ are hydrogen, halogen, a $C_1$–$C_{20}$ alkyl or an aryl, x is 1 to 5, y is to 4 and n is 1 to 100, and a polydimethylsiloxane block of the formula

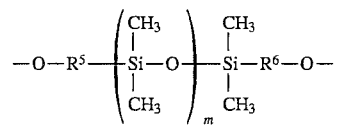

wherein $R^5$ and $R^6$ are an organic residue having an aromatic nucleus and m is greater than or equal to 100, the copolymer having a content of the polydimethylsiloxane block of 0.5 to 10% by weight, an n-hexane soluble matter content in an amount of 1.0% by weight or less and a viscosity average molecular weight of 10,000–50,000. The copolymer has a high impact resistance and when blended with a glass fiber or a carbon fiber forms a molded product having an extremely high Izod impact strength.

12 Claims, 2 Drawing Sheets

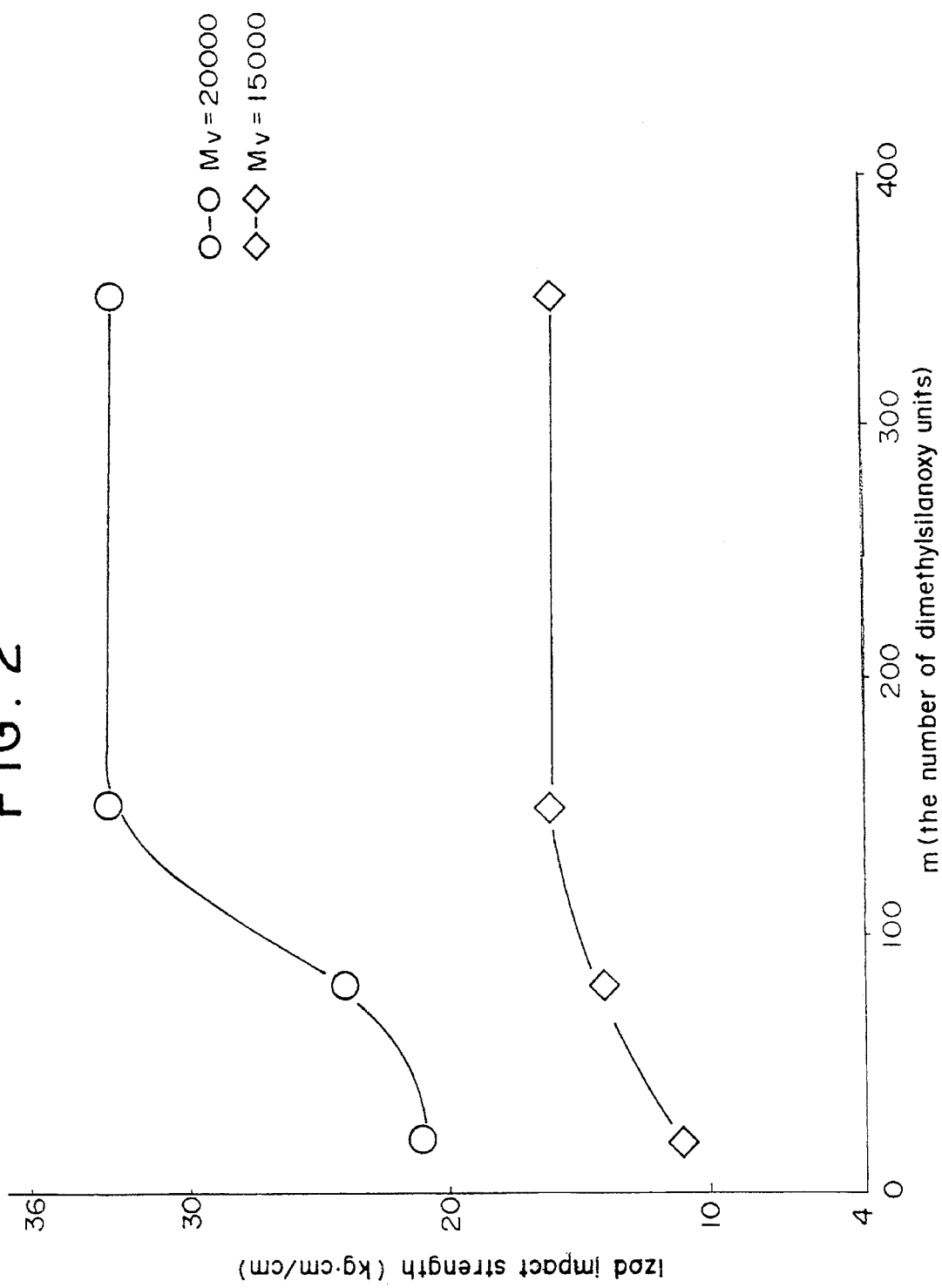

RESIN COMPOSITION CONTAINING A POLYCARBONATE-POLYDIMETHYLSILOXANE

This application is a continuation of application Ser. No. 08/009,384 filed Jan. 27, 1993, abandoned, which is a continuation of application Ser. No. 07/640,416 filed Jan. 15, 1991 (abandoned), which is the United States national phase application of International Application No. PCT/JP90/00864 filed Jul. 5, 1990.

TECHNICAL FIELD

The present invention relates to a polycarbonate-polydimethylsiloxane copolymer and a process for production thereof. Particularly, it relates to a novel polycarbonate-polydimethylsiloxane copolymer which is excellent in impact resistance, a composition containing it and a process for efficiently producing it.

BACKGROUND TECHNIQUE

Glass fibers have hitherto been added to polycarbonate order to improve its rigidity and dimensional stability. The addition of the glass fibers, however, makes the polycarbonate subject to brittle fracture and lowers the Izod impact strength. Thus, a variety of polycarbonates have been investigated for the purpose of finding the one which is excellent in impact resistance. For instance, the blending of a polycarbonate with a filler and an organopolysiloxanepolycarbonate block copolymer has been proposed in Japanese Patent Application Laid-Open No. 160052/1980, but such blending is still unsatisfactory for improving the impact resistance.

Also, a composition which comprises blending a polycarbonate with a glass fiber free of a sizing agent and a siloxane has been proposed in Japanese Patent Application Laid-Open (PCT application) No. 501860/1982. Furthermore, in Japanese Publication No. 35929/1984, there has been proposed a composition comprising a polycarbonate with a glass fiber and an organopolysiloxane having a specified viscosity. However, the molded articles produced from these two compositions have also a problem of incomplete insulation.

DISCLOSURE OF THE INVENTION

Thus, the present inventors have conducted earnest research for the purpose of solving the aforementioned problems. As a result, it has been found that a polycarbonate block copolymer having excellent impact resistance can be obtained by using a specified polydimethylsiloxane. The present invention has been achieved on the basis of such information.

That is, the present invention provides a polycarbonate-polydimethylsiloxane copolymer comprising a polycarbonate block represented by the formula (I)

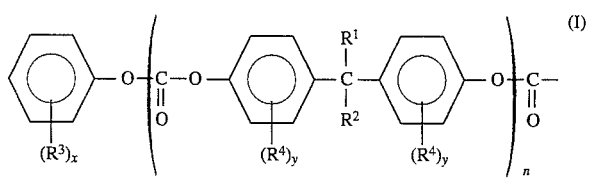

wherein $R^1$ and $R^2$ independently represent hydrogen or an alkyl group having 1–4 carbon atoms, $R^3$ and $R^4$ independently represent halogen, an alkyl group having 1–20 carbon atoms or an aryl group, x denotes an integer of 0–5, y denotes an integer of 0–4 (when x=0 and y=0, $R^3$ and $R^4$ are equivalent to hydrogen) and n denotes an integer of 1–100, and a polydimethylsiloxane block represented by the formula (II)

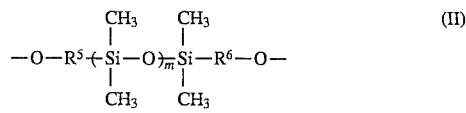

wherein $R^5$ and $R^6$ independently represent an organic residue having an aromatic nucleus, and m denotes an integer of not less than 100, characterized in that the copolymer has a content of the polydimethylsiloxane block portion of 0.5–10% by weight, a n-hexane soluble matter in an amount of 1.0% by weight or less and a viscosity average molecular weight of 10,000–50,000. The present invention also provides a process for preparing the above mentioned polycarbonate-polydimethylsiloxane copolymer comprising reacting an organic dihydroxy compound represented by the formula (III)

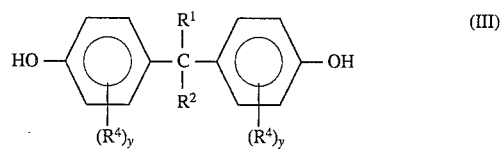

wherein $R^1$ $R^2$, $R^4$ and y have the same meanings as defined above, a polydimethylsiloxane represented by the formula (IV)

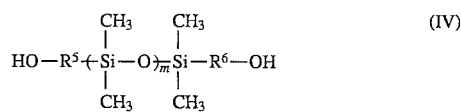

wherein $R^5$ $R^6$ and m have the same meanings as defined above, and a carbonate forming derivative in a liquid medium in the presence of a molecular weight modifier. Furthermore, the present invention provides a resin composition comprising 40–90% by weight of the aforementioned polycarbonate-polydimethylsiloxane copolymer and 60–10% by weight of an inorganic filler.

BRIEF DESCRIPTION OF THE DRAWINGS

FIG. 2 is a graph which demonstrates the relationship between the number of dimethylsilanoxy units at the polydimethylsiloxane portion in the polycarbonate-polydimethylsiloxane copolymer used and Izod impact strength of the molded article therefrom.

BEST MODES FOR CARRYING OUT THE INVENTION

Figure 1:
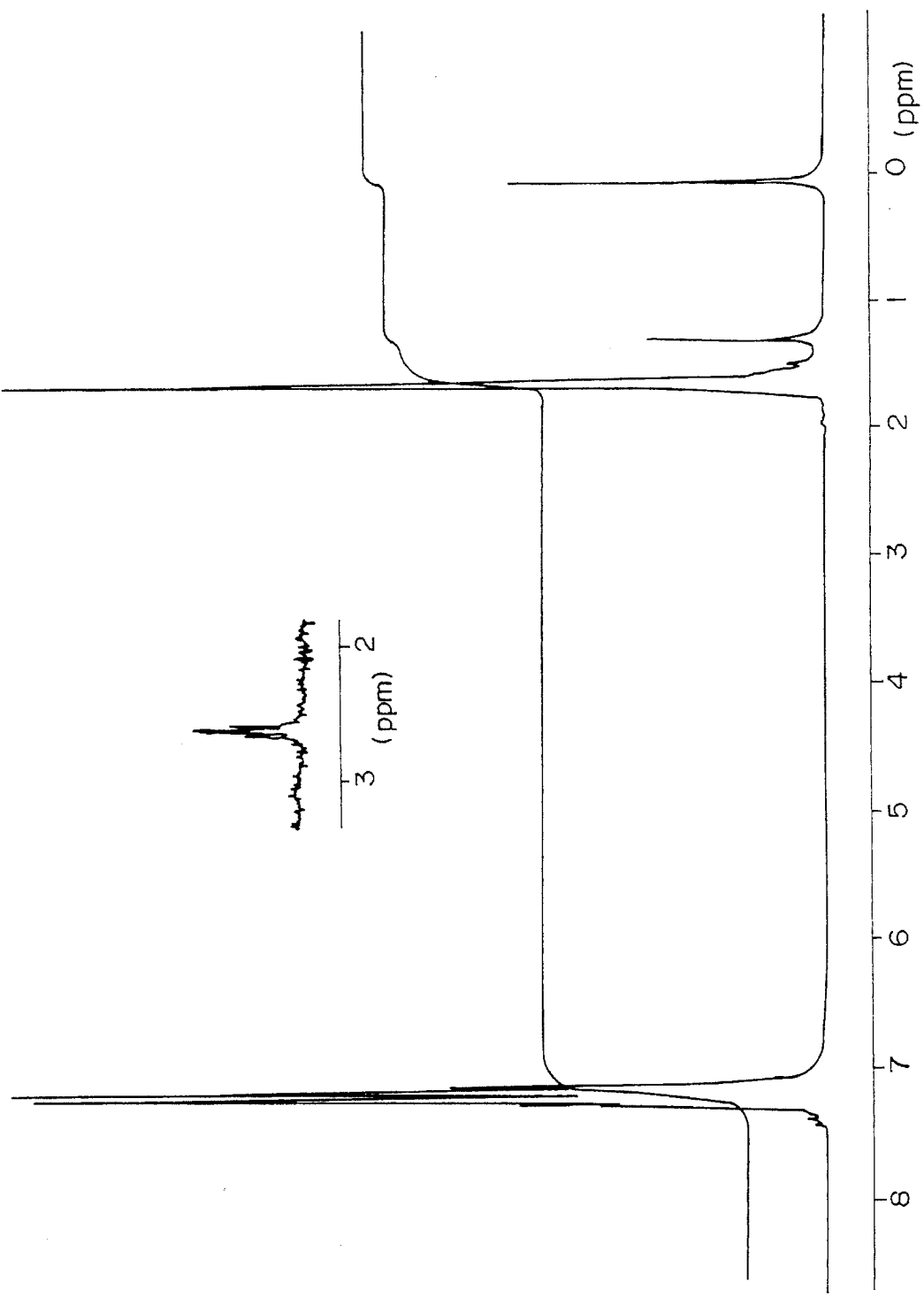
FIG. 1 is a proton nuclear magnetic resonance ($^1$H-NMR) spectrum of the polycarbonate-polydimethylsiloxane copolymer prepared in Example 2.

The polycarbonate-polydimethylsiloxane copolymer of the present invention is, as described above, a block copolymer comprising the polycarbonate (hereinafter referred sometimes to as PC) block represented by the formula (I) and a polydimethylsiloxane (hereinafter referred sometimes to as PDMS) block represented by the formula (II).

$R^1$ and $R^2$ in the formulae (I) and (III) independently represent hydrogen or an alkyl group having 1–4 carbon atoms, such as a methyl group, an ethyl group, a n-propyl group, an i-propyl group, a n-butyl group, an i-butyl group, a s-butyl group or a t-butyl group. $R^3$ and $R^4$ in the formulae (I) and (III) independently represent halogen (e.g. chlorine, fluorine, bromine and the like), an alkyl group having 1–20 carbon atoms (e.g. a methyl group, an ethyl group, a n-propyl group, an i-propyl group, a n-butyl group, an i-butyl group, a s-butyl group, a t-butyl group, a n-octyl group, a t-octyl group, a n-decyl group, a n-octadecyl group and the like) or an aryl group (e.g. a phenyl group, a benzyl group, an α,α-dimethylbenzyl group and the like).

As the organic dihydroxy compound represented by the formula (III), there are mentioned a variety of compounds such as a bis(4-hydroxyphenyl)alkane. More specifically, there are mentioned bisphenols such as 2,2-bis(4-hydroxyphenyl)propane (trivial name: bisphenol A), bis(4hydroxyphenyl)methane, 1,1-bis(4-hydrophenyl)ethane, 1,1bis(4-hydroxyphenyl)propane, 2,2-bis(4-hydroxypheneyl)butane, 2,2-bis(4-hydroxyphenyl)pentane, 2,2-bis(4-hydroxyphenyl)isopentane, 2,2-bis(4-hydroxyphenyl)hexane, 2,2-bis(4-hydroxyphenyl)isohexane, 4,4-dihydroxytriphenylmethane, 4,4-dihydroxytetraphenylmethane, 1,1-bis(4-hydroxyphenyl)cyclohexane, 2,2-bis(4,4-hydroxy-3-methylphenyl)propane, 2,2-bis(4,4-hydroxy-3,5-dimethylphenyl)propane and the like.

In the terminal hydroxy group-containing polydimethylsiloxane represented by the formula (IV), $R^5$ and $R^6$ represent an organic residue having an aromatic nucleus. As the organic residue having an aromatic nucleus, there are mentioned, for example, a 3-(o-hydroxyphenyl)propylene group, a 2-(p-hydroxyphenyl)ethylene group or groups represented by the formula

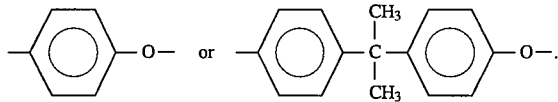

The polydimethylsiloxane represented by the formula (IV) can be synthesized, for example, by reacting octamethylcyclotetrasiloxane and disiloxane to produce a terminal hydrogen-containing polydimethylsiloxane, which is then reacted with an allylphenol to give a terminal phenol-containing polydimethylsiloxane. In this connection, the repeating number of the dimethylsilanoxy units can be controlled by changing the proportion of octamethylcyclotetrasiloxane and disiloxane. The process for producing the compound can be illustrated by the following reaction scheme:

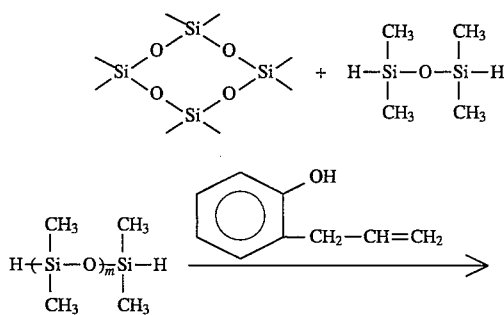

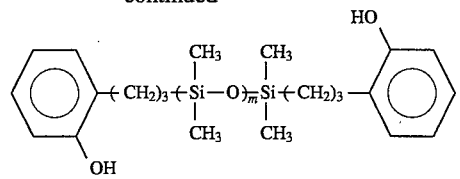

In this connection, the repeating number m of the dimethylsilanoxy units is required to be 100 or more. If m is less than 100, the blending of the compound with a glass fiber brings about the lowering of the Izod impact resistance. If m exceeds 400, the production of the compound becomes difficult to an impractical level.

After the reaction was completed, vacuum distillation is preferably conducted to remove low boiling components (mainly dimer and trimer). The condition of vacuum distillation is not particularly limited, and it is sufficient to carry out the distillation at a temperature of 100°–200° C. under a vacuum of 10 Torr or less until no low boiling components will be removed (for example, for 1–200 minutes).

As the carbonate forming derivative, phosgene is usually used. It is also possible to use various compounds other than phosgene, such as bromophosgene, diphenyl carbonate, di-p-tolyl carbonate, phenyl-p-tolyl carbonate, di-p-chlorophenyl carbonate, dinaphthyl carbonate or the like, or a polycarbonate oligomer comprising these compounds and the aforementioned organic dihydroxy compounds.

In the present invention, it is necessary to have a molecular weight modifier involved in the reaction system on the preparation of the polycarbonate-polydimethylsiloxane copolymer (hereinafter referred sometimes to as PC-PDMS copolymer) from the above mentioned organic dihydroxy compound, the polydimethylsiloxane and the carbonate forming derivative. As the molecular weight modifier, there may be used various compounds such as, particularly, pentahalogenophenols (e.g. pentabromophenol, pentachlorophenol and pentafluorophenol), trihalogenophenols (e.g. tribromophenol, trichlorophenol, and trifluorophenol), phenol, p-cresol, p-tert-butylphenol, p-tert-octylphenol, p-cumylphenol and the like.

The charge amount of the organic dihydroxy compound may be appropriately determined depending on the polymerization degree of a polycarbonate block to be prepared. On the other hand, the charge amounts of the molecular weight modifier and the carbonate forming derivative regulate the polymerization degree of the polycarbonate block. Therefore, the charge amounts may be determined depending on the purposes. The molecular weight modifier may be charged specifically in an amount which is satisfactory for bonding it to the terminal position (particularly both terminal positions) of the resulting polycarbonate or in a slightly excessive amount as standard.

The polydimethylsiloxane is preferably incorporated in an amount of 0.5–10% by weight, particularly 1–10% by weight in the copolymer. If the polydimethylsiloxane is contained in an amount less than 0.5% by weight, the blending of the compound with a glass fiber brings about the lowering of the Izod impact resistance. On the other hand, if it is contained in an amount exceeding 10% by weight, the heat distortion temperature is lowered.

The process of the present invention is to prepare the PC-PDMS copolymer by carrying out the reaction in a liquid medium, specifically in accordance with the well-known interfacial polymerization method or the pyridine method.

For instance, interfacial polycondensation is carried out by blowing a carbonate forming derivative such as phosgene into a mixture of a solution of the polydimethylsiloxane represented by the formula (IV) dissolved in an inert organic solvent such as methylene chloride, chloroform, chlorobenzene, carbon tetrachloride or the like and a solution of the organic dihydroxy compound represented by the formula (III) dissolved in an alkali solution such as an aqueous sodium hydroxide solution, an aqueous potassium hydroxide solution or the like. In this reaction, a molecular weight modifier is added to the reaction system preliminarily or at the step where the reaction has been conducted to a certain extent. It is also useful to add preliminarily a tertiary amine such as triethylamine or the like as a catalyst to the reaction system. Further, the reaction is exothermic, and thus the reaction system is preferably cooled with water or ice. Also, the reaction system shifts acidic as the reaction proceeds, so that the reaction system is preferably maintained at pH of 10 or more by the addition of an alkali with measuring the pH of the reaction system.

Furthermore, it is also useful to carry out the interfacial polycondensation by the method in which a polycarbonate oligomer is preliminarily prepared from the organic dihydroxy compound represented by the formula (III) and the carbonate forming derivative, and then the resultant oligomer, the polydimethylsiloxane represented by the formula (IV), the molecular weight modifier, the above-described inert organic solvent, the alkali solution and a catalyst are mixed by stirring in a predetermined proportion.

On the other hand, according to the pyridine method, the organic dihydroxy compound represented by the formula (III), the polydimethylsiloxane represented by the formula (IV) and the molecular weight modifier are dissolved in pyridine or a mixed solvent of pyridien and an inert solvent, and the carbonate forming derivative such as phosgene or the like is blown into the resultant solution to produce the desired PC-PDMS copolymer.

The copolymer obtained as above which comprises the PC block represented by the formula (I) and the PDMS block represented by the formula (II) has a viscosity average molecular weight in the range of 10,000–50,000, preferably 12,000–30,000. If the copolymer has a viscosity average molecular weight of less than 10,000, it has poor in Izod impact resistance and thus is not suitable for the object of the present invention. On the other hand, it is difficult to prepare a copolymer having a viscosity average molecular weight exceeding 50,000.

Further, the PC-PDMS copolymer of the present invention has a n-hexane soluble matter of 1.0% by weight or less. If the copolymer has a n-hexane soluble matter exceeding 1.0% by weight, the blend of it with an inorganic filler such as glass fiber or the like brings about little improvement in Izod impact resistance. In order to improve the Izod impact resistance particularly of a blend of it and glass fiber, the PC-PDMS copolymer has preferably a crystallinity of 30% or more.

It is sufficient for the preparation of the PC-PDMS copolymer having a n-hexane soluble matter of 1.0% by weight or less than, for example, the aforementioned copolymerization reaction is carried out by decreasing the PDMS content in the copolymer to 10% by weight or less and using a PDMS having 100 or more dimethylsilanoxy repeating units and a catalyst such as a tertiary amine or the like in an amount of $5.3 \times 10^{-3}$ mole or more per 1 kg of the oligomer.

Furthermore, the composition of the present invention comprises 40–90% by weight of the aforementioned PC-PDMS copolymer and 60–10% by weight of the inorganic filler. As the inorganic filler, there are mentioned various fillers such as glass fibers, carbon fibers and the like. The glass fibers may be either of alkali-containing glasses, low-alkali glasses or alkali-free glasses and has a fiber length of 1–8 mm, preferably 3–6 mm and a fiber diameter of 3–20 μm, preferably 5–15 μm. The forms of the glass fibers are not limited particularly and include various forms such as rovings, milled fibers, chopped strands and the like. These fibers may be used alone or in the combination of the two or more. Such glass fibers may be surface-treated with a silane type coupling agent such as aminosilane, epoxysilane, vinylsilane, methacrylsilane or the like, a chromium complex compound, a boron compound or the like to increase the affinity to the aforementioned copolymer.

As the carbon fibers, there are mentioned the ones such as flame resistant, carbonaceous or graphitaceous fibers which are generally prepared by calcining raw materials such as cellulose fibers, acrylic fibers, lignin, petroleum or coal type specialty pitches or the like. The carbon fibers in the pellet have generally a length in the range of 0.01–10 mm and a diameter in the range of 5–15 μm. The forms of the carbon fibers are not limited particularly and include various forms such as rovings, milled fibers, chopped strands and the like. These carbon fibers may be surface-treated with an epoxy resin or an urethane resin to increase the affinity to the aforementioned copolymer.

As the other fillers, there are mentioned fillers having a variety of forms such as plate, particle, powder or the like. Specifically, there can be mentioned glass beads, glass flakes, glass powders, talk, mica, calcium carbonate and the like.

The resin composition of the present invention comprises as the main components the aforementioned PC-PDMS copolymer and the inorganic filler, and if necessary, PC or PDMS as well as a PC-PDMS copolymer having a PDMS content less than 0.5% by weight can be added provided that the PDMS content in the abovementioned copolymer is in the range of 0.5–10% by weight.

EXAMPLE

The present invention is further described in detail with reference to the following examples.

Preparation Example 1-1 (Synthesis of terminal phenol containing PDMS)

1483 g of octamethylcyclotetrasiloxane, 18.1 g of 1,1,3,3-tetramethyldisiloxane and 35 g of 86% sulfuric acid were mixed and stirred at room temperature for 17 hours. Then, the resulting oil phase was separated, and 25 g of sodium hydrogen carbonate was added. After the mixture was stirred for 1 hour, it was filtered, and the filtrate was distilled in vacuum at 150° C. under 3 Torr to remove low-boiling materials.

To the mixture of 60 g of 2-allylphenol and 0.0014 g of platinum as a platinum chloride-alcoholate complex was added the oil obtained above at a temperature of 90° C. The mixture was stirred at a temperature in the range of 90° C.–115° C. for 3 hours. The product was extracted with methylene chloride and washed three times with a 80% aqueous methanol to remove the residual amount of 2-allylphenol. The product was dried over anhydrous sodium sulfate, and the solvent was removed in vacuum by heating to a temperature of 115° C.

According to the nuclear magnetic resonance (NMR) analysis, it was found that the terminal phenol PDMS thus obtained had 150 repeating dimethylsilanoxy units.

Preparation Example 1-2 (Synthesis of terminal phenol-containing PDMS)

The procedure of Preparation Example 1-1 was repeated except that the amount of 1,1,3,3-tetramethyldisiloxane was change to 7.72 g.

According to the NMR analysis, it was found that the terminal phenol PDMS thus obtained had 350 repeating dimethylsilanoxy units.

Preparation Example 1-3 (Synthesis of terminal phenol-containing PDMS)

The procedure of Preparation Example 1-1 was repeated except that the amount of 1,1,3,3-tetramethyldisiloxane was changed to 137 g.

According to the NMR analysis, it was found that the terminal phenol PDMS thus obtained had 20 repeating dimethylsilanoxy units.

Preparation Example 1-4 (Synthesis of terminal phenol-containing PDMS)

The procedure of Preparation Example 1-1 was repeated except that the amount of 1,1,3,3-tetramethyldisiloxane was changed to 33.5 g.

According to the NMR analysis, it was found that the terminal phenol PDMS thus obtained had 80 repeating dimethylsilanoxy units.

Preparation Example 2 (Synthesis of a polycarbonate oligomer of bisphenol A)

A solution of bisphenol A in aqueous sodium hydroxide was prepared by dissolving 60 kg of bisphenol A in 400 liters (1) of a 5% aquous sodium hydroxide solution. Next, the solution of bisphenol A in aqueous sodium hydroxide maintained at room temperature and methylene chloride were introduced into a tubular reactor having an internal diameter of 10 mm and a tube length of 10 m through an orifice plate at a flow rate of 138 l/hour and 69 l/hour, respectively. At the same time, phosgene was also introduced at a flow rate of 10.7 kg/hour, and the reaction was continuously carried out for 3 hours. The tubular reactor used in this reaction was a jacketed tube, and cooling water was flown through the jacket portion to maintain the exiting temperature of the reaction mixture at 25° C. The pH of the exiting mixture was adjusted to 10–11. The reaction mixture thus obtained was left standing to separate and remove the aqueous phase. The methylene chloride phase (220 l) was collected, and 170 l of methylene chloride was added to this methylene chloride phase. The mixture was sufficiently stirred to give a polycarbonate oligomer (317 g/l). The polycarbonate oligomer thus obtained had a polymerization degree of 3–4.

Examples 1–12 and Comparative Examples 1–10 a grams of the reactive PDMS obtained in Preparation Example 1-X was dissolved in 2 l of methylene chloride, and the resulting solution was mixed with 10 l of the polycarbonate oligomer obtained in Preparation Example 2. To the mixture thus obtained were further added a solution of 26 g of sodium hydroxide dissolved in 1 l of water and d cc of triethylamine, and the mixture was stirred at 500 rpm at room temperature for 1 hour. Then, a solution of 600 g of bisphenol A dissolved in 5 l of a 5.2% by weight aqueous sodium hydroxide solution, 8 l of methylene chloride and b g of p-tert-butylphenol were added to the mixture, and the stirring was conducted at room temperature for 2 hours. Then, 5 l of methylene chloride was added to the mixture, and the whole mixture was washed with 5 l of water, 5 l of 0.01N aqueous sodium hydroxide solution as an alkali, 5 l of 0.1N hydrochloric acid as an acid and 5 l of water in this sequence. Finally, methylene chloride was removed to give the PC-PDMS copolymer in the form of chips. The values of X (sub-number of Preparation Example 1), a, b and d in Examples 1–12 and Comparative Examples 1–10 are listed in Table 1. The viscosity average molecular weight, PDMS chain length (dimethylsilanoxy unit), PDMS content and n-hexane soluble matter of the PC-PDMS copolymer thus obtained are listed in Table 2. The flow value, flexural modulus, Izod impact resistance, heat distortion temperature (HDT) and crystallinity of the molded product are listed in Table 3. Also, a proton nuclear magnetic resonance ($^1$H-NMR) spectrum of the PC-PDMS copolymer prepared in Example 2 is shown in FIG. 1. The relationship between the number of the dimethylsilanoxy units of the polydimethylsiloxane portion in the PC-PDMS copolymer prepared in Examples and Comparative Examples, and Izod impact strength of the molded product is shown in FIG. 2.

TABLE 1

| No. | X* | a | b | d |
| --- | --- | --- | --- | --- |
| Example 1 | 1 | 91 | 119 | 5.7 |
| Example 2 | 2 | 91 | 119 | 5.7 |
| Example 3 | 1 | 185 | 119 | 5.7 |
| Example 4 | 2 | 185 | 119 | 5.7 |
| Example 5 | 1 | 380 | 119 | 5.7 |
| Example 6 | 2 | 380 | 119 | 5.7 |
| Example 7 | 1 | 91 | 81 | 5.7 |
| Example 8 | 2 | 91 | 81 | 5.7 |
| Example 9 | 1 | 185 | 81 | 5.7 |
| Example 10 | 2 | 185 | 81 | 5.7 |
| Example 11 | 1 | 380 | 81 | 5.7 |
| Example 12 | 2 | 380 | 81 | 5.7 |
| Comparative Example 1 | 4 | 91 | 119 | 5.7 |
| Comparative Example 2 | 3 | 91 | 119 | 5.7 |
| Comparative Example 3 | 4 | 185 | 119 | 5.7 |
| Comparative Example 4 | 3 | 185 | 119 | 5.7 |
| Comparative Example 5 | 4 | 185 | 81 | 5.7 |
| Comparative Example 6 | 3 | 185 | 81 | 5.7 |
| Comparative Example 7 | 1 | 740 | 81 | 5.7 |
| Comparative Example 8 | 1 | 91 | 119 | 1.2 |
| Comparative Example 9 | 2 | 91 | 81 | 1.2 |
| Comparative Example 10 | 4 | 91 | 119 | 12.0 |

*Sub-number X of Preparation Example 1-X

TABLE 2

| No. | Viscosity average molecular weight (Mv) | PDMS chain length (m) | PDMS content (% by weight) | n-hexane soluble matter (%) |
| --- | --- | --- | --- | --- |
| Example 1 | 15000 | 150 | 2 | 0.4 |
| Example 2 | 15000 | 350 | 2 | 0.4 |
| Example 3 | 15000 | 150 | 4 | 0.6 |
| Example 4 | 15000 | 350 | 4 | 0.7 |
| Example 5 | 15000 | 150 | 8 | 0.8 |
| Example 6 | 15000 | 350 | 8 | 0.8 |
| Example 7 | 20000 | 150 | 2 | 0.3 |
| Example 8 | 20000 | 350 | 2 | 0.3 |
| Example 9 | 20000 | 150 | 4 | 0.5 |
| Example 10 | 20000 | 350 | 4 | 0.6 |
| Example 11 | 20000 | 150 | 8 | 0.7 |
| Example 12 | 20000 | 350 | 8 | 0.7 |
| Comparative Example 1 | 15000 | 80 | 2 | 1.1 |
| Comparative Example 2 | 15000 | 20 | 2 | 1.2 |
| Comparative Example 3 | 15000 | 80 | 4 | 1.2 |
| Comparative Example 4 | 15000 | 20 | 4 | 1.4 |
| Comparative Example 5 | 20000 | 80 | 4 | 1.1 |
| Comparative Example 6 | 20000 | 20 | 4 | 1.3 |
| Comparative Example 7 | 20000 | 150 | 15 | 1.1 |
| Comparative Example 8 | 15000 | 150 | 2 | 1.4 |
| Comparative Example 9 | 20000 | 350 | 2 | 1.6 |

TABLE 2-continued

| No. | Viscosity average molecular weight (Mv) | PDMS chain length (m) | PDMS content (% by weight) | n-hexane soluble matter (%) |
|---|---|---|---|---|
| Comparative Example 10 | 15000 | 80 | 2 | 0.8 |

In the table above, the PDMS content and PDMS chain length (dimethylsilanoxy unit) were determined as follows. That is, the PDMS content was calculated from the intensity ratio of the methyl group peak in the isopropyl of the bisphenol A at 1.7 ppm to the methyl group peak of the dimethylsiloxane at 0.2 ppm of the $^1$H-NMR spectrum. The PDMS chain length was calculated from the intensity ratio of the methyl group peak of the dimethylsiloxane at 0.2 ppm to the methylene group peak of the PC-PDMS bonding part at 2.6 ppm of the $^1$H-NMR spectrum.

The n-hexane soluble matter is a component extracted with the Soxhlet apparatus using n-hexane as solvent, and the determination of it was carried out as follows. That is, 15 g of the copolymer in the form of chips as a sample was collected in a cylindrical filter paper No. 84 (28×100 mm) and extracted with 300 ml of n-hexane by refluxing for 8 hours at a refluxing amount of 20 ml at an interval of 3–4 minutes. Then, 300 ml of n-hexane was evaporated, and the residue as the n-hexane soluble matter was weighed.

TABLE 3

| No. | Flow value | Flexural modulus | Izod impact resistance | HDT | Crystallinity |
|---|---|---|---|---|---|
| Example 1 | 41 | 27900 | 53 | 125 | 35 |
| Example 2 | 43 | 27900 | 55 | 125 | 36 |
| Example 3 | 40 | 28000 | 55 | 122 | 35 |
| Example 4 | 45 | 27700 | 52 | 123 | 35 |
| Example 5 | 44 | 27900 | 54 | 120 | 33 |
| Example 6 | 41 | 27800 | 50 | 120 | 34 |
| Example 7 | 11 | 25000 | 79 | 125 | 34 |
| Example 8 | 10 | 24900 | 81 | 124 | 36 |
| Example 9 | 10 | 25100 | 83 | 122 | 33 |
| Example 10 | 11 | 25000 | 80 | 122 | 34 |
| Example 11 | 11 | 25000 | 81 | 121 | 32 |
| Example 12 | 10 | 25200 | 79 | 122 | 34 |
| Comparative Example 1 | 42 | 28000 | 52 | 125 | 28 |
| Comparative Example 2 | 40 | 27500 | 46 | 124 | 27 |
| Comparative Example 3 | 40 | 28000 | 50 | 122 | 28 |
| Comparative Example 4 | 39 | 27000 | 49 | 121 | 26 |
| Comparative Example 5 | 10 | 27600 | 80 | 121 | 27 |
| Comparative Example 6 | 10 | 24900 | 77 | 121 | 26 |
| Comparative Example 7 | 10 | 24800 | 78 | 115 | 25 |
| Comparative Example 8 | 40 | 27500 | 51 | 122 | 31 |
| Comparative Example 9 | 11 | 24700 | 79 | 124 | 32 |
| Comparative Example 10 | 40 | 27800 | 53 | 125 | 27 |

The values listed in Tables 2 and 3 were determined as follows:

Flow value (×10$^{-2}$ ml/sec): In accordance with JIS-K-7210;

Flexural modulus (kg/cm$^2$): In accordance with JIS-K-7103;

Izod impact resistance (kg-cm/cm): In accordance with JIS-K-7110;

HDT (heat distortion temperature) (° C.): In accordance with JIS-K-7207;

Mv (viscosity average molecular weight): Calculated in terms of the viscosity of the methylene chloride solution at 20° C. in an Ubbellohde viscometer;

Crystallinity: A 5 mg sample of the copolymer was placed in an aluminium pan, and the melting peak area obtained from the chart of a differential scanning calorimeter (DSC) measured at a programming temperature of 40° C./min was represented by S (kilojoule/mol) to calculate the crystallinity from the following equation: C (%)=(S/27.9)×100 wherein 27.9 (kilojoule/mol) is a melting enthalpy obtained for a complete crystal having 100% crystallinity (see J.P.S., B8, 645 (1970)).

Application Examples 1–28

The PC-PDMS copolymers prepared in Examples and Comparative Examples or the polycarbonates (trade name: Toughlon A-2200, Mv=21,000, manufactured by Idemitsu Petrochemical Co., Ltd.; trade name: Iupilon H-4000 N-600, Mv=15,000, manufactured by Mitsubishi Gas Chemical Co., Inc.) were used as base polymers, blended with a glass fiber (GF; an alkali-free glass surface-treated with aminosilane, fiber length: 6 mm, fiber diameter: 13 μm) and extruded from an extruder with a 30 mm vented extruder to form pellets. These pellets were injection-molded at a molding temperature of 300° C. into a molded article to determine the physical properties. The results are listed in Table 4. In this connection, the glass fiber was supplied downstream of the raw material resin supply position to a hopper in an extruder.

TABLE 4

| No. | Base polymer | Polymer/GF | Izod impact resistance*[1] (kg cm/cm) | Strength of breakage*[2] (kg/cm$^2$) | Flexural modulus*[3] (kg/cm$^2$) |
|---|---|---|---|---|---|
| Application Example 1 | Example 1 | 70/30 | 16 | 1300 | 86500 |
| Application Example 2 | Example 2 | 70/30 | 16 | 1300 | 87500 |
| Application Example 3 | Example 3 | 70/30 | 17 | 1300 | 82900 |
| Application Example 4 | Example 4 | 70/30 | 17 | 1300 | 84500 |

TABLE 4-continued

| No. | Base polymer | Polymer/GF | Izod impact resistance*[1] (kg cm/cm) | Strength of breakage*[2] (kg/cm$^2$) | Flexural modulus*[3] (kg/cm$^2$) |
|---|---|---|---|---|---|
| Application Example 4 | Example 5 | 70/30 | 18 | 1300 | 86200 |
| Application Example 5 | Example 6 | 70/30 | 18 | 1300 | 85500 |
| Application Example 6 | Example 7 | 70/30 | 31 | 1300 | 86500 |
| Application Example 7 | Example 8 | 70/30 | 32 | 1300 | 85500 |
| Application Example 8 | Example 9 | 70/30 | 33 | 1300 | 84300 |
| Application Example 9 | Example 10 | 70/30 | 33 | 1200 | 86200 |
| Application Example 10 | Example 11 | 70/30 | 32 | 1300 | 84200 |
| Application Example 11 | Example 12 | 70/30 | 33 | 1200 | 86200 |
| Application Example 12 | Comparative Example 1 | 70/30 | 13 | 1300 | 84000 |
| Application Example 13 | Comparative Example 2 | 70/30 | 11 | 1200 | 84000 |
| Application Example 14 | Comparative Example 3 | 70/30 | 14 | 1200 | 81700 |
| Application Example 15 | Comparative Example 4 | 70/30 | 11 | 1300 | 86500 |
| Application Example 16 | Comparative Example 5 | 70/30 | 24 | 1200 | 83400 |
| Application Example 17 | Comparative Example 6 | 70/30 | 21 | 1200 | 83500 |
| Application Example 18 | Comparative Example 7 | 70/30 | 30 | 1000 | 76500 |
| Application Example 19 | Comparative Example 8 | 70/30 | 12 | 1300 | 86300 |
| Application Example 20 | Comparative Example 9 | 70/30 | 20 | 1300 | 85000 |
| Application Example 21 | Comparative Example 10 | 70/30 | 14 | 1300 | 84200 |
| Application Example 22 | A-2200 | 70/30 | 18 | 1200 | 79800 |
| Application Example 23 | H-4000 | 70/30 | 8 | 1200 | 80000 |
| Application Example 24 | Example 7 | 90/10 | 19 | 1100 | 60000 |
| Application Example 25 | A-2200 | 90/10 | 9 | 1100 | 58000 |
| Application Example 26 | Example 7 | 50/50 | 26 | 1700 | 123000 |
| Application Example 27 | A-2200 | 50/50 | 17 | 1600 | 118000 |

*[1]measured in accordance with JIS-K-7110;
*[2]measured in accordance with JIS-K-7113;
*[3]measured in accordance with JIS-K-7103.

Application Examples 29–32

The PC-PDMS copolymers obtained in Example 7 or a polycarbonate (trade name: Toughlon A-2200, Mv=21000, manufactured by Idemitsu Petrochemical Co., Ltd.) were used as the base polymers and blended with Glass beads (EGB-731A, manufactured Toshiba-Palodini Co., Ltd.). The resultant blend was extruded from a 30 mm vented extruder to prepare pellets, which were injection-molded at a molding temperature of 300° C. The Izod impact strength was measured for the molded product. The results are shown in Table 5. In this connection, the Glass fiber was supplied downstream of the raw material resin supply position to a hopper in an extruder.

TABLE 5

| No. | Base polymer | Polymer/ glass beads | Izod impact strength*[1] (kg-cm/cm) |
|---|---|---|---|
| Application Example 29 | Example 7 | 70/30 | 7.8 |
| Application Example 30 | A-2200 | 70/30 | 3.7 |
| Application Example 31 | Example 7 | 50/50 | 7.5 |
| Application Example 32 | A-2200 | 50/50 | 3.5 |

TABLE 5-continued

| No. | Base polymer | Polymer/ glass beads | Izod impact strength*[1] (kg-cm/cm) |
|---|---|---|---|

*[1] measured in accordance with JIS-K-7110

Application Examples 33–36

The PC-PDMS copolymers obtained in Example 7 or a polycarbonate (trade name: Toughlon A-2200, Mv=21000, manufactured by Idemitsu Petrochemical Co., Ltd.) were used as the base polymers and blended with carbon fibers (trade name: Besfight, manufactured by Tohobeslon Co., Ltd.). The resultant blend was extruded from a 30 mm vented extruder to prepare pellets, which were injection-molded at a molding temperature of 300° C. The Izod impact strength was measured for the molded product. The results are shown in Table 6. In this connection, the carbon fiber was supplied downstream of the raw material resin supply position to a hopper in an extruder.

TABLE 6

| No. | Base polymer | Polymer/ carbon fiber | Izod impact strength*[1] (kg-cm/cm) |
|---|---|---|---|
| Application Example 33 | Example 7 | 70/30 | 9.8 |
| Application Example 34 | A-2200 | 70/30 | 5.4 |
| Application Example 35 | Example 7 | 90/10 | 12.3 |
| Application Example 36 | A-2200 | 90/10 | 8.0 |

INDUSTRIAL APPLICABILITY

The PC-PDMS copolymer of the present invention has a high impact resistance and can be blended with an inorganic filler such as an glass fiber or the like to prepare a molded product having an extremely high Izod impact strength.

According to the process of the present invention, the PC-PDMS copolymer can be prepared efficiently.

Therefore, the present invention is expected to be applied effectively to the preparation of molded products excellent in impact resistance.

What is claimed is:

1. A resin composition comprising
   (i) 40 to 90 weight % of a polycarbonate-polydimethylsiloxane copolymer, said copolymer comprising
      (a) a polycarbonate block represented by the formula $$-\underset{(R^3)_x}{\bigcirc}-O-\left[\underset{O}{\overset{\|}{C}}-O-\underset{(R^4)_y}{\bigcirc}-\underset{R^2}{\overset{R^1}{\underset{|}{C}}}-\underset{(R^4)_y}{\bigcirc}-O\right]_n-\underset{O}{\overset{\|}{C}}-$$

wherein $R^1$ and $R^2$ independently represents hydrogen or an alkyl group having 1–4 carbon atoms, $R^3$ and $R^4$ independently represent halogen, an alkyl group having 1–20 carbon atoms or an aryl group, x denotes an integer of 0–5, y denotes an integer of 0–4 and n denotes an integer of 1–100, and
   (b) a polydimethylsiloxane block represented by the formula $$-O-R^5-\left(\underset{\underset{CH_3}{|}}{\overset{\overset{CH_3}{|}}{Si}}-O\right)_m-\underset{\underset{CH_3}{|}}{\overset{\overset{CH_3}{|}}{Si}}-R^6-O-$$

wherein $R^5$ and $R^6$ independently represent an organic residue having an aromatic nucleus, and m denotes an integer greater than or equal to 100,
   said copolymer having a content of the polydimethylsiloxane block of 0.5–10% by weight, an n-hexane soluble matter content in an amount of 1.0% by weight or less and a viscosity average molecular weight of 10,000–50,000, and
   (ii) 60 to 10% by weight of an inorganic filler.

2. The resin composition according to claim 1, wherein $R^5$ and $R^6$ independently represent an organic residue of a 3-(o-hydroxyphenyl)propyl group, a 2-(p-hydroxyphenyl)ethyl group or the groups represented by the formula $$-\bigcirc-O- \quad \text{or} \quad -\bigcirc-\underset{\underset{CH_3}{|}}{\overset{\overset{CH_3}{|}}{C}}-\bigcirc-O-.$$

3. A resin composition according to claim 1, wherein the inorganic filler is a glass fiber or a carbon fiber.

4. The resin composition according to claim 1, wherein in said copolymer the polydimethylsiloxane is in an amount of 1 to 10% by weight.

5. The resin composition according to claim 1, wherein $R^3$ and $R^4$ independently are chlorine, fluorine, bromine, methyl, ethyl, n-propyl, i-propyl, n-butyl, i-butyl, s-butyl, t-butyl, n-octyl, t-octyl, n-decyl, n-octadecyl, phenyl, benzyl or α,α-dimethylbenzyl.

6. The resin composition according to claim 1, wherein the viscosity average molecular weight is 12,000 to 30,000.

7. The resin composition according to claim 6, wherein the mixture has a crystallinity of 30% or more.

8. The resin composition according to claim 1, wherein m is 100 to 400.

9. The resin composition according to claim 2, wherein the polydimethylsiloxane is in an amount of 1 to 10% by weight; m is 100 to 400; $R^3$ and $R^4$ independently are chlorine, fluorine, bromine, methyl, ethyl, n-propyl, i-propyl, n-butyl, i-butyl, s-butyl, t-butyl, n-octyl, t-octyl, n-decyl, n-octadecyl, phenyl, benzyl or α,α-dimethylbenzyl; the viscosity average molecular weight is 12,000 to 30,000; and the copolymer has a crystallinity of 30% or more.

10. The resin composition according to claim 1, wherein the polydimethylsiloane is in an amount of 0.5 to 10% by weight.

11. A polycarbonate-polydimethylsiloxane copolymer having an n-hexane soluble matter content in an amount of 1.0% by weight or less produced by reacting an organic dihydroxy compound of the formula $$HO-\underset{(R^4)_y}{\bigcirc}-\underset{R^2}{\overset{R^1}{\underset{|}{C}}}-\underset{(R^4)_y}{\bigcirc}-OH$$

wherein $R^1$ and $R^2$ independently represent hydrogen or an alkyl group having 1–4 carbon atoms, $R^3$ and $R^4$ independently represent halogen, an alkyl group having 1–20 carbon atoms or an aryl group, x denotes an integer of 0–5, y denotes denotes an integer of 0–4 and n denotes an integer of 1–100, a polydimethylsiloxane of the formula

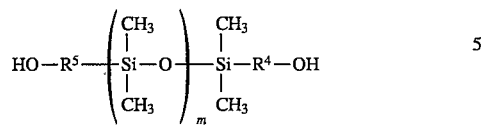

wherein $R^5$ and $R^6$ independently represent an organic residue having an aromatic nucleus, and m denotes an integer greater than or equal to 100, and a carbonate forming compound selected from the group consisting of phosgene, bromophosgene, diphenyl carbonate, di-p-tolyl carbonate, phenyl-p-tolyl carbonate, di-p-chlorophenyl carbonate and dinaphthyl carbonate in a liquid medium in the presence of a molecular weight modifier selected from the group consisting of a pentahalogenophenol, a trihalogenophenol, phenol, p-cresol, p-tert-butylphenol, p-tert-butyl octylphenol and p-cumylphenol.

12. The polycarbonate-polydimethylsiloxane copolymer according to claim 11, wherein the reaction is carried out in the presence of a tertiary amine catalyst in an amount of $5.3 \times 10^{-3}$ mole or more per 1 kg of an oligomer.

* * * * *

UNITED STATES PATENT AND TRADEMARK OFFICE
CERTIFICATE OF CORRECTION

PATENT NO. : 5,502,134
DATED : March 26, 1996
INVENTOR(S) : OKAMOTO et al

It is certified that error appears in the above-indentified patent and that said Letters Patent is hereby corrected as shown below:

Column 14, line 26, Claim 3: replace "A" with --The--.

Signed and Sealed this

Eighteenth Day of August, 1998

Attest:

BRUCE LEHMAN

*Attesting Officer*    *Commissioner of Patents and Trademarks*